United States Patent [19]

Okano

[11] Patent Number: 4,607,357

[45] Date of Patent: Aug. 19, 1986

[54] OPTICAL PICKUP APPARATUS FOR RECORDED INFORMATION WITH TILT INDICATION

[75] Inventor: Takashi Okano, Tokorozawa, Japan

[73] Assignee: Pioneer Electronic Corporation, Tokyo, Japan

[21] Appl. No.: 623,396

[22] Filed: Jun. 22, 1984

[30] Foreign Application Priority Data

Jun. 24, 1983 [JP] Japan ............................ 58-097476[U]

[51] Int. Cl.$^4$ ............................................. G11B 7/08
[52] U.S. Cl. ........................................ 369/44; 369/58
[58] Field of Search ................. 369/44, 46, 54–58, 369/116; 358/342

[56] References Cited

U.S. PATENT DOCUMENTS 4,374,324  2/1983  Van Rosmaker et al. ........ 369/44 X
4,502,134  2/1985  Kondo et al. ..................... 369/46

FOREIGN PATENT DOCUMENTS 57-179954  11/1982  Japan ................................... 369/58

Primary Examiner—Aristotelis M. Psitos
Attorney, Agent, or Firm—Fleit, Jacobson, Cohn & Price

[57] ABSTRACT

An optical pickup apparatus for reading information recorded on a recording medium, having an optical pickup device and a tilt servo control system for adjusting the angular position of the pickup device, the tilt servo control system comprising a deviation detection means including a light emitting means and a light receiving means, for detecting a deviation of the angle between an axis of the reading light from the optical pickup device and the surface of the recording medium from a right angle and generating a deviation detection signal, and a tilt drive mechanism connected to the optical pickup device, driven by a tilt drive signal generated from the deviation detection signal. The apparatus is characterized by a means for opening the servo loop of the tilt servo system when the light beam from the light emitting means has approached a portion of the recording medium in which no recording tracks are provided.

5 Claims, 15 Drawing Figures

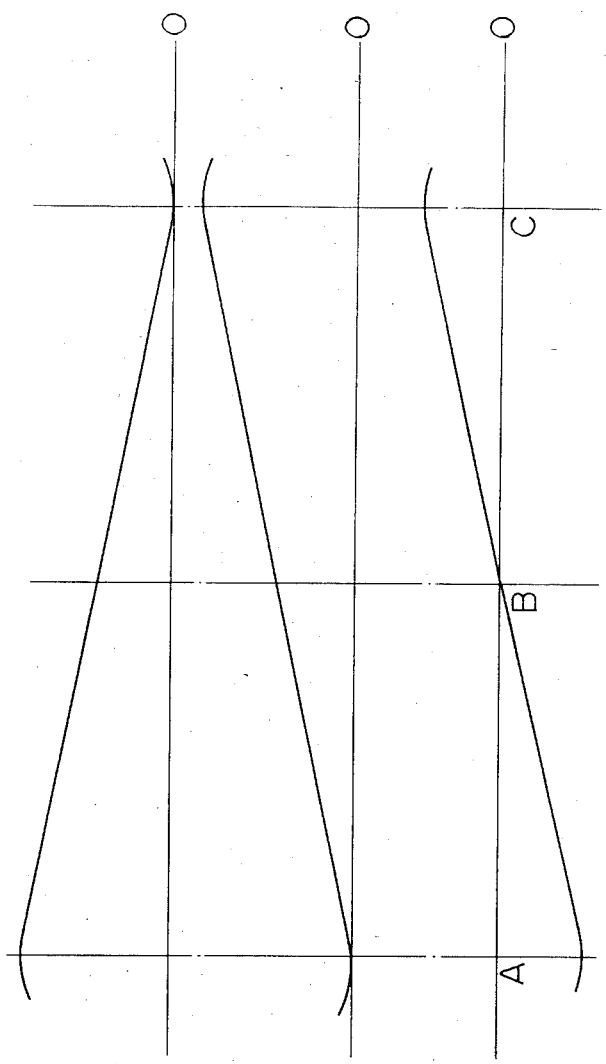

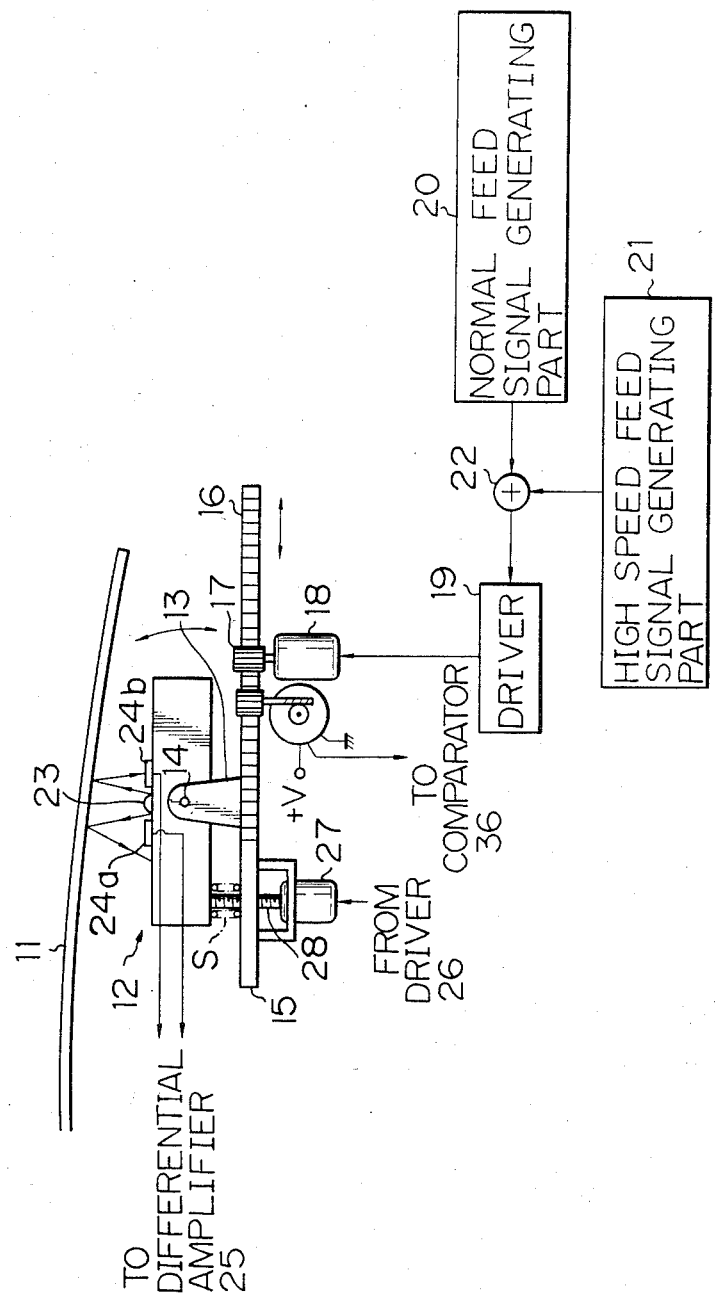

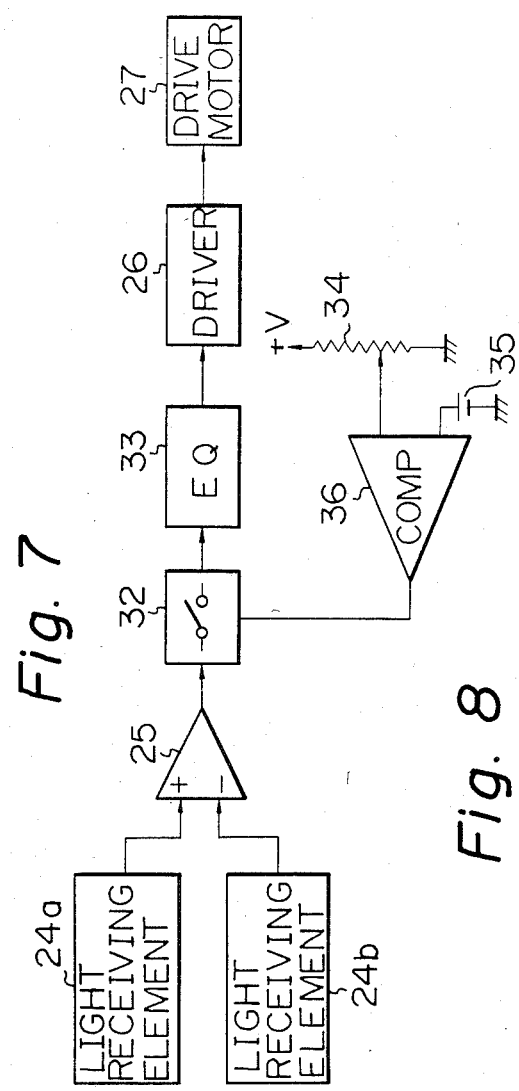
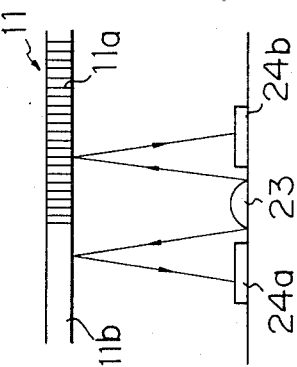

OPTICAL PICKUP APPARATUS FOR RECORDED INFORMATION WITH TILT INDICATION

BACKGROUND OF THE INVENTION

1. Field of the Invention

The present invention relates to an optical pickup apparatus for picking up a recorded information, and more specifically to a pickup apparatus having the so called tilt servo system for maintaining an orthogonal relation between an optical axis of the read-out light beam and the surface of the recording disc.

2. Description of Background Information

In the case of optical information playback system, if an angle between the axis of the reading light beam and the surface of the recording disc deviates from a right angle, the so called crosstalk, that is, the leaking of information of adjacent recording tracks will necessarily occur. This angular deviation from a right angle results from several causes, such as the deformation of the recording disc into an umbrella-like form due to the secular change, and the inclination of the axis of rotation of the disc as the result of deformation of some parts of a disc drive unit of the playback system. Since most of these problems arise after the product is put into the market, the above occurence of crosstalk is rather difficult to prevent.

In order to maintain a precise orthogonal relation between the optical axis of the reading light beam and the surface of the recording disc, the so called tilt servo system has been proposed, in which the angular relation is controlled according to the result of an electronical detection of the above mentioned crosstalk. As an example of this "tilt servo" system, the present applicant has already proposed a technique which is disclosed in Japanese Utility Model application, No. 58-063397. However, in the tilt servo control system of the above utility model application, there was a drawback that a malfunction of the system tends to occur when the optical pickup is located at a position of the recording disc where no recording tracks are provided.

SUMMARY OF THE INVENTION

An object of the invention is therefore to provide an optical pickup apparatus for reading an information, which is free from malfunctions even if the optical pickup is located in the vicinity of a portion of the recording disc where no recording tracks are provided.

According to the present invention, the optical pickup apparatus with a tilt servo control system which includes a means for detecting an angle between the axis of the light beam for reading information and the surface of the recording disc, which means comprises a light emitting means for projecting a light beam to the surface of the recording disc, and a light receiving means for receiving a reflection light of the light beam projected by the light emitting means and reflected by the surface of the recording disc, characterized by a means for opening the tilt servo loop when the light beam projected from the light emitting means has approached a portion of the recording disc in which no recording tracks are provided as the movement of the pickup device.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 5A to 5C are graphs showing the variation of the output signal of the light receiving elements under various state of the inclination of the recording disc;

FIG. 6 is a schematic diagram of the optical pickup apparatus of the present invention;

FIG. 7 is a blockdiagram showing the construction of the circuit portion of the tilt servo loop of the apparatus of FIG. 6;

FIG. 8 is a diagram showing the position of the light emitting element and the light receiving element with respect to the portion of the recording disc without any recordiing tracks.

DETAILED DESCRIPTION OF THE PREFERRED EMBODIMENTS

Figure 1:
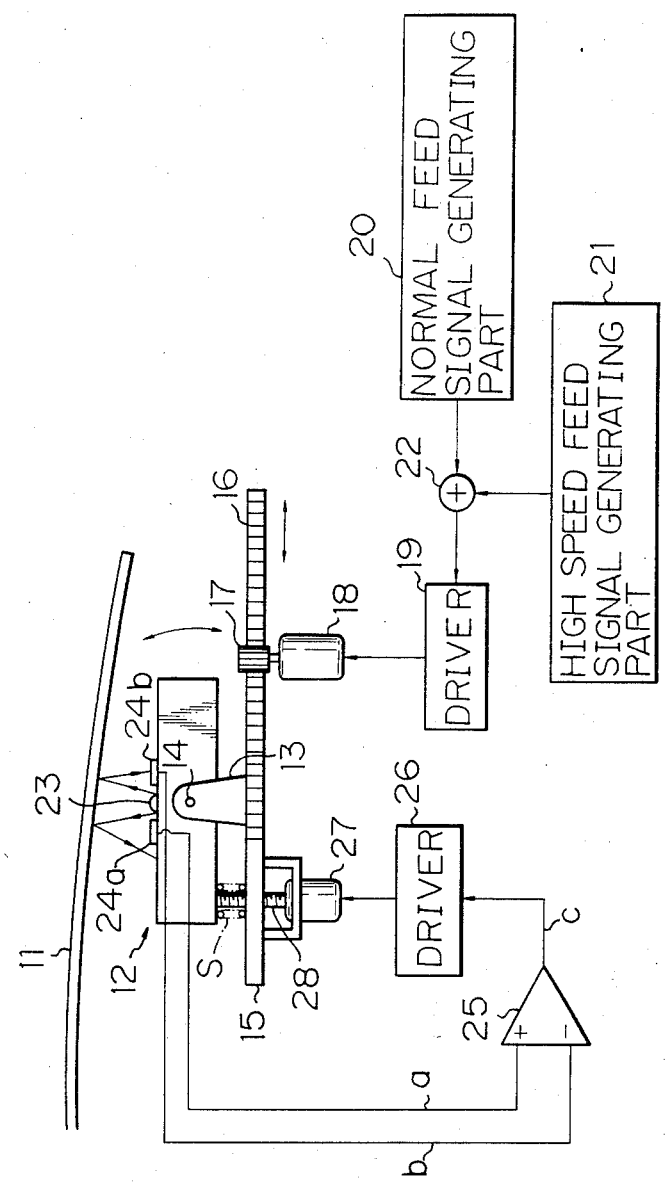
FIG. 1 is a shematic diagram of the optical pickup apparatus with a tilt servo system which has been proposed by the present applicant.

Before entering into the explanation of the preferred embodiment of the optical pickup apparatus of the present invention, reference is first made to FIG. 1 in which the pickup apparatus proposed by the applicant is illustrated.

As shown, a pickup apparatus is disposed below a recording disc 11 (referred to simply as "disc" hereinafter), and it is assumed that the surface of the disc 11 is declined with respect to the holizontal plane due to the deformation of the disc 11.

In order to optically pickup the information recorded on the disc 11, an optical head unit 12 is provided and supported by a support member 13. On the support member 13, the optical head unit (referred to a head unit hereinafter) 12 is arranged so as to be rotatable about a shaft of rotation 14. Further, the support member 13 is secured on a slider 15 for translating the head unit 12 in a radial direction of the the disc 11. The construction of the slider is such that a rack gear 16 is provided to a part of the slider and a pinion gear 17 driven by a slider motor 18 is meshed to the rack gear 16.

The system is further provided with a normal feed signal generating part 20 which produces a signal for normal feed of the slider, by detecting the dc component contained in an error signal generated by a tracking signal generating means (not shown). The apparatus is further provided with a high speed feed signal generating part 21 for generating a high speed feed signal which is to be utilized during an address search operation and the so-called scanning operation. Out put signals of the normal feed signal generating part 20 and the high speed feed signal generating part 21 are then supplied to the a driver 19 via an adder 22, so as to control the rotation of the slider motor 18. To detect the inclination of the disc 11, a light emitting element 12 and a pair of light receiving elements 24a and 24b are provided on the head unit 12. Output signals of the light receiving elements 24a and 24b are then applied to a differential amplifier 25 by which a signal indicative of the difference between the output signal of the photo receiving elements 24a and 24b is produced. The difference signal is applied to the drive motor 27 via a driver 26. An external thread portion formed on a spindle of the drive motor 27 is engaged with an internal thread formed in a part of the head unit 12, so that the rotation of the spindle of the drive motor 27 is transformed to a tilting of the head unit 12 about the shaft 14 of the support member 13 and a desired tilting angle is obtained by the rotation of the drive motor 27. In addition, a compression spring S is provided around the external thread of the spindle of the motor 27 so as to prevent the backlash.

Figure 2:
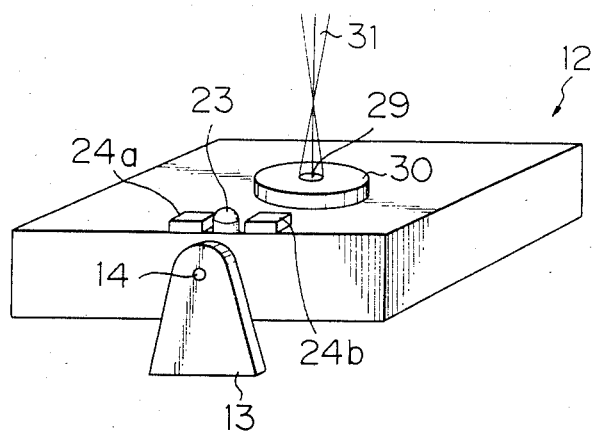
FIG. 2 is a perspective view of the optical head unit of the apparatus of FIG. 1.

FIG. 2 is a perspective view of the head unit 12. A light beam for optically reading information generated by a laser source which is housed in the head unit 12 is converged on the recording surface of the disc 11 by means of an object lens 29. The center of the object lens 29 is positioned substantially at a point where an axis 31 of the light beam meets the shaft 14. For the translating movement of the object lens 29 along the axis 31 of the light beam, to always converge the light beam on the disc, there is privided the so called focus actuator which is, for example, made up of a magnetic circuit and a coil disposed therein.

A line which passes a center of the object lens 29 and the center of the light emitting element 23 is made substantially parallel with the tangential direction of the recording track, and the location of the light emitting element 23 is preferably determined for lighting a part of a recording track which is preceding a position at which the light beam is converged during reading of the recorded information, that is, an "information read position."

Figure 3A:
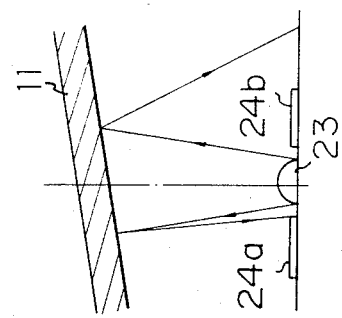
FIGS. 3A to 3C are diagrams showing various state of the application of the light beam to the surface of the recording disc.
Figure 3B:
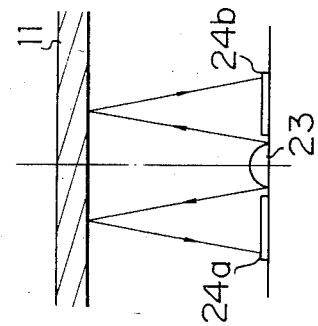
Figure 3C:
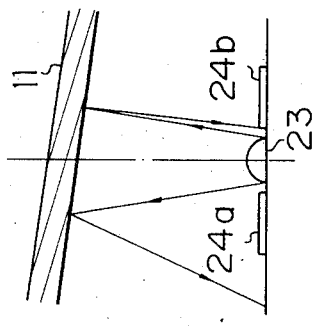
Figure 4A:
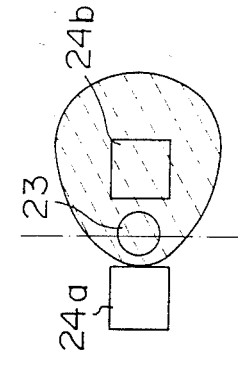
FIGS. 4A to 4C are diagrams corresponding to FIGS. 3A to 3C, particularly showing the form of the light beam applied to the light receiving elements.
Figure 4B:
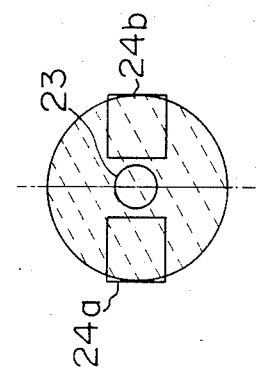
Figure 4C:
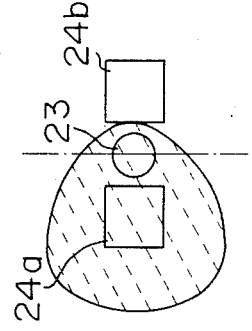

FIGS. 3A to 3C are diagrams which illustrate the manners of reflection of the light beam projected from the light emitting element 23, under various states of angular relation between the disc and the optical pickup. The manner of reflection under these states are also illustrated in FIGS. 4A through 4C, which on the other hand, are viewed from the disc 11. FIG. 5A through 5C are diagrams respectively showing the manner of variation of the output signals of the photo receiving elements 24a and 24b, and the output signal of the differential amplifier 25 with respect to the magnitude and the direction of the inclination of the disc relative to the optical axis. Specifically, FIGS. 5A and 5B show the output signals of the photo receiving elements 24a and 24b, and FIG. 5C shows the output signal of the differential amplifier 25. Further, the positions A, B, and C of FIGS. 5A through 5C correspond to the states respectively illustrated in FIGS. 3A through 3C, and especially, the position B represents the state of FIG. 3B in which the disc is placed almost holizontally and the optical axis 31 is perpendicular to the disc 11.

In this condition in which the optical axis is normal to the surface of the disc, the light projected from the light emitting element 23 which is moderately diverging is directed to the disc and then reflected by the recording surface of the disc. The reflected light is then evenly received by the light receiving elements 24a and 24b, and therefore, the output signal of the differential amplifier 25 which receives the output signals of the light receiving elements 24a and 24b becomes equal to zero in this condition.

On the other hand, in case the disc is deformed into the unbrella-like form and the surface of the disc is inclined as shown in FIGS. 3A and 3C, the angle between the optical axis and the surface of the disc will deviate from the right angle. In the case of FIG. 3A for instance, only one 24a of the light receiving element 24a and 24b is applied with the reflection light, and the output signal level thereof becomes maximum, and at the same time, the output signal level of the light receiving element 24b turns to the minimum. Therefore, the output signal level of the differential amplifier 25 becomes maximum in the positive polarity. On the other hand, if the angular relation between the optical axis and the plane of the disc is as illustrated in FIG. 3C, then only one 24b of the light receiving elements 24a and 24b is applied with the reflection light, and the level of the output signal of the light receiving elements 25 becomes maximum in the negative polarity.

Thus, the level and the polarity of the output signal of the differential amplifier 25 represent the direction and the magnitude of the deviation of the angle between the light axis and the surface of the disc from a right angle. If a closed loop control is effected so that the differential output signal c becomes equal to zero, then the optical axis 31 of the light beam can be controlled to be right angle to the plane of the disc. Further, if the intensity of the light emitted by the light emitting element 23 is distributed according the Gaussian distribution, then the slope of the characteristic curve of the output signal of the differential amplifier 25 can be greater and the sensitivity of the detection operation can be raised. Under this condition, there will be much freedom of selecting the size and the arrangement of the light receiving elements 24a snd 24b.

Thus, in the tilt servo system of FIG. 1, the drive motor 27 is driven in accordance with the output signal of the differential amplifier 25, and the optical head unit 12 is rotated around the shaft of rotation 14.

In the case of a playback system having this type of tilt servo system, when the recording track of the disc is traced by means of the pickup device from the inner side to the outer periphery and the pickup device is approaching the most external portion in which no information is recorded, the position of the light from the light emitting element 23 also reach the portion of no information. In this state, there is an instant when the light from the light emitting element 23 is directed both to the portion of no information and the portion having tracks for the recording information. This state of the application of light will result in rather large flucturation of the output signals of the light receiving elements 24a and 24b, which has been resulted in the malfunction of the tilt servo system as mentioned before.

The preferred embodiment of the optical pickup apparatus of the present invention will be explained with reference to the shematic diagram of FIGS. 6 and 8, and the block diagram of FIG. 7 hereinafter.

In FIG. 6, like reference numerals used in FIGS. 1 and 2 denote like parts, and the detailed explanation thereof are omitted. As shown, the optical head unit 12 which forms a pickup device is arranged in the same manner as in FIG. 1, and a potentiometer 34 is associated to the slider 15 so that the output signal of the potentiometer 15 varies with the movement of the optical head unit 12 in the radial direction of the disc 11.

Turning to FIG. 7, the pair of light receiving elements 24a and 24b for detecting the angle of inclination are provided, and output signals thereof are applied to a differential amplifier 25, to produce a servo error signal in the same manner as described with reference to FIG. 1. The servo error signal produced by the differantial amplifier 25 is then applied to a driver 26 via a servo loop switch 32 and an equalizer 33. An output signal of the dirver 26 is applied to the drive motor 27 to control the tilt angle of the optical head unit 12.

On the other hand, the optical head unit 12, forming the pickup, is provided with a potentiometer 34 whose output signal varies with the movement of the optical head unit 12 in the radial direction of the disc. The output signal of the potentiometer 34 and a predetermined reference voltage 35 are applied to a level comparator 35 in which the voltage levels of the input signals are compared with each other. With an output signal of the comparator, the servo loop switch is turned off to open the tilt servo loop.

In this arrangement, the information reading point of the object lens 29 and the point for detecting the inclination angle by means of the light emitting element 23 and the light receiveing elements 24a and 24b which form the inclination angle detection device, are made substantially equal with each other. Therefore, it can be said that the inclination angle of the surface of the disc in the vicinity of the position for the reading of the recorded information is always correctly detected under normal operation.

When the pickup 12 approaches the most outer part of the recording tracks on the disc, the light projected from the light emitting element 23 also covers the portion 11b of the disc in which no recording tracks are present, slightly before the position of reading light beam reaches the most outer part of the recording tracks. This is because the diameter of the light beam projected from the light emitting element 23 is generally selected to be relatively large. In FIG. 7, the portion 11a represents the portion in which the recording tracks are present.

By the above reason, the magnitude of light received by the light receiving element 24a is significantly increased in this instant, as the result, the tilt servo error signal will contain an erroneous information.

In the case of the pickup apparatus of the present invention, the output signal of the potentiometer 34 whose voltage level varies with the position of the pickup 12, is compared with the predetermined reference voltage 35 in the comparator 36. When the voltage level of the output signal from the potentiometer 34 reaches the predetermined voltage 35, the servo loop switch 32 is turned off to open the tilt servo loop.

Therefore, the erroneous operation of the tilt servo loop can be prevented by determining the voltage level of the predetermined reference votage 35 at a level of the output signal of the potentiometer 34 obtained when the pickup 12 is located at a position in which the light from the light emitting element 23 is projected to a position close to the portion of no recording tracks.

When the tilt servo loop is opened, the power supply of the drive motor 27 is no more continued, and the rotation of the drive motor 27 is stopped at a pont of the time when the tilt servo loop is opened. Thus, the erroneous function of the tilt servo system is prevented and the magnitude of the crosstalk is maintained at the lowest level.

Figure 9:
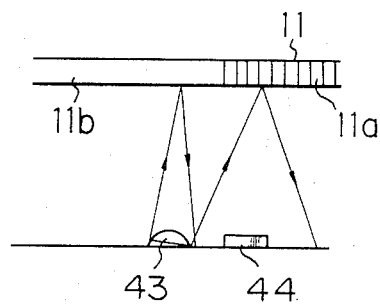
FIG. 9 is a diagram showing the arrangement of the light emitting element and a light receiving element used in the second embodiment of the optical pickup apparatus of the present invention.

In the case of the example shown in FIG. 6, a potentiometer was employed to detect that the pickup has approached to the portion of no recording tracks, therefore the system is effective when the diameter of the portion of the disc having no tracks is constant. However, the system is not applicable under a state where this diameter may change. To avoid this problem, as shown in FIG. 9, the portion of no recording tracks can be detected by means of a light emitting element 43 and a light receiving element 44 provided at a position which precedes the position of the light emitting element 23, and the light receiving elements 24a and 24b with respect to the movement of the pickup device. In that case, the portion of no recording tracks may be detected when the reflection light of this light emitting element 43 detected by the light receiving element 44 has changed significantly, and the tilt servo switch can be turned off upon detection of the above position. For realizing this operation, the same circuit construction as FIG. 7 can be utilized and the output signal of the light receiving element 44 may be applied to an input terminal of the comparator 36. Further, instead of providing the above mentioned additional light emitting element and the light receiving element, the portion of no tracks can be detected by means of the combination of the light emitting element 23 and one (preferably 24a) of the light receiving elements 24a and 24b, by utilizing the output signal of the selected one of the light elements 24a and 24b.

It will be appreciated from the foregoing, according to the present invention, the malfunction of the tilt servo system at a position of the no recording portion of the disc can be prevented, and the crosstalk component characteristics can be significantly improved.

In addition, it should be understood that the foregoing description is for illustrative purpose only, and is not intended to limit the scope of the invention. Rather, there are numerous equivalents to the preferred embodiment, and such are intended to be covered by the appended claims. As an example, various arrangements and constructions for optically detecting the tilting angle can be utilized in place of the structure utilized in the above example.

What is claimed is:

1. An optical pickup apparatus for optically reading information recorded on recording tracks of a recording medium, having a movably disposed optical pickup unit and a tilt servo control system adapted to actuate a tilt drive mechanism connected to the optical pickup unit according to a deviation of an angle between an axis of a reading light projected from the optical pickup unit and a recording surface of the recording medium from a right angle, which is detected by a deviation detection means, said deviation detection means comprises a light emitting means for projecting a light beam to the recording surface of the recording medium, a light receiving means for receiving a reflection light of the light beam projected by the light emitting means and reflected by the surface of the recording medium and producing a pair of output signals, and a tilt drive signal generating means for generating a tilt drive signal from the output signals of the light receiving means and applying the tilt drive signal to the tilt drive mechanism, characterized by a means for opening a tilt servo loop when the light beam projected from the light emitting means has approached a portion of the recording medium in which no recording tracks are provided, as the movement of the optical pickup unit.

2. An optical pickup apparatus for optically reading information recorded on recording tracks of a recording medium, having a movably disposed optical pickup unit and a tilt servo control system for adjusting an angle between an axis of a reading light projected from the optical·pickup unit and a recording surface of the recording medium, said tilt servo control system comprises:

a light emitting means for projecting a light beam to the recording surface of the recording medium;

a light receiving means for receiving a reflection light of the light beam projected by the light emitting means and reflected by the surface of the recording medium and producing a pair of output signals;

a tilt drive signal generating means for generating a tilt drive signal from the output sigals of the light receiving means;

a tilt drive mechanism connected to the optical pickup unit and driven by the tilt drive signal generated by the tilt drive signal generating means; and a preventing means for preventing the generation of the tilt drive signal when the light beam projected from the light emitting means has approached a portion of the recording medium in which no recording tracks are provided, as the movement of the optical pickup unit.

3. An optical pickup apparatus as recited in claim 2, wherein said preventing means comprises:

a detection means for detecting a condition that the light beam projected from the light emitting means has approached a portion of the recording medium in which no recording tracks are provided, and producing a detection signal; and a switching means disposed in said tilt drive signal generating means for normally enabling a transmisstion of a signal from the light receiving means and disabling the transmission of the signal from the light receiving means upon receipt of said detection signal from the detection means.

4. An optical pickup apparatus as recited in claim 3, wherein said detection means comprises:

a potentiometer associated to said optical pickup unit and producing a voltage signal whose voltage level veries with the movement of the pickup unit;

a comparator for comparing the voltage signal from the potentiometer with a predetermined reference voltage corresponding to a voltage level of the voltage signal which is obtained when the pickup unit is in the vicinity of the portion of the recording disc in which no recording tracks are provided, and producing an output signal as the detection signal when the voltage signal has exceeded the predetermined reference voltage.

5. An optical pickup apparatus as recited in claim 3, wherein said detection means comprises a light emitting means for projecting an auxiliary light beam to the surface of the recording medium, and an auxiliary light receiving means for receiving the light beam projected by the light emitting means and reflected by the surface of the recording midium, and the detection signal is generated when the output signal of the light emitting element has changed significantly due to the reflection of the light beam by the portion of the recording mediun where no recording tracks are provided.

* * * * *